Jan. 28, 1969

H. KROBATH 3,424,977

CAPACITIVE DEVICE RESPONSIVE TO WATER VAPOR CONTENT OF A GAS
INCLUDING INSULATED CONDUCTIVE WIRE
ELECTRODES FORMING A GRID

Filed May 4, 1966

INVENTOR.
HANS KROBATH

BY his ATTORNEYS.

United States Patent Office 3,424,977
Patented Jan. 28, 1969

3,424,977
CAPACITIVE DEVICE RESPONSIVE TO WATER VAPOR CONTENT OF A GAS INCLUDING INSULATED CONDUCTIVE WIRE ELECTRODES FORMING A GRID
Hans Krobath, Glen Cove, N.Y., assignor to Human Resources Foundation, Albertson, N.Y., a corporation of New York
Filed May 4, 1966, Ser. No. 547,653
U.S. Cl. 324—61    9 Claims
Int. Cl. G01r 27/26

ABSTRACT OF THE DISCLOSURE

This invention relates to a novel and improved device for determining the water vapor content of a gas. This device includes a capacitance element which is constituted by two groups of spaced-apart insulated conductive wires arranged generally as a grid so that the wires of one of the two groups cross those of the other.

---

Figure 1:
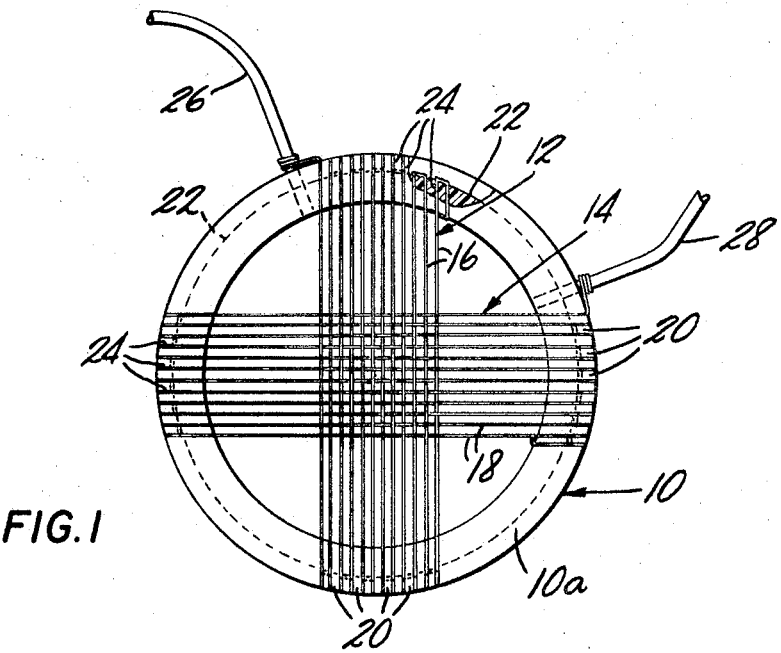

A number of types of apparatus have been used to measure the moisture content of air. The most widely used types are psychromatic devices in which the temperature of the air is measured by a wet bulb and a dry bulb thermometer and values are compared. Another commonly used type employs a hygroscopic element in which changes in the humidity of the air result in significant dimensional changes in the element, the dimensional changes being amplified by a mechanical linkage coupled to a pointer or being otherwise detected and indicated. In addition to psychromatic and hygroscopic devices, other types of apparatus employed for special purposes have been used, but to a lesser extent. Generally speaking, the types of vapor sensing apparatus presently known have the disadvantage of being relatively slow to respond to changes in vapor content and are therefore not satisfactory when it is desired to measure a vapor content which is changing within short intervals of time.

For example, the modalities of respiration, including the moisture content of the expired air, are of importance in showing the overall health of a patient, and in particular, in indicating pulmonary and certain other conditions. Inasmuch as the respiratory pattern involves significant changes in the water vapor content between the inspirational and expirational phases, a rapidly responding instrument for measuring vapor content is required. In my recently granted U.S. Patent No. 3,232,288 (issued Feb. 1, 1966 for "Respiratory Analysis Instrument"), I have disclosed, inter alia, a humistor element for measuring the moisture content of the expired gas which involves detecting the change in electrical resistance of a fine strand of organic material, such as silk, in which salt crystals have been impregnated. Moisture in the expired air passing the salt-impregnated strands is absorbed and significantly increases the conductivity of the silk strand to a degree proportional to the water vapor concentration. The device has a relatively rapid rate of response to change in moisture content, the response being on the order of $\frac{1}{15}$ of a second, and it also provides noteworthy accuracy.

The present invention relates to a novel and improved vapor sensing apparatus suitable not only for apparatus of the type disclosed in my above-referred to patent, but for a wide variety of instruments and devices for measuring the water vapor content of a gas. More particularly, the vapor sensing apparatus, in accordance with the invention, includes a capacitance element which is constituted by two groups of spaced-apart insulated conductive wires arranged generally as a grid so that the wires of one of the two groups cross those of the other. The wires of each group are electrically connected together, each group of wires preferably being formed by wrapping a single wire back and forth across a supporting frame, so that each group forms one plate of the capacitor. The wires of the respective groups touch each other at the points where they cross, so that a minimum air space is left between the wires; to this end, the wires of each group may be interwoven with the wires of the other group.

When a radio frequency signal is impressed across the capacitor and a change in the water vapor content of a gas to which the capacitor is exposed occurs, a marked change in capacitance occurs which can be detected by a suitable capacitance measuring circuit. For example, the capacitance element can form one leg of a bridge circuit, and the change in direct current voltage across the circuit can be detected by filtering the negative portions of the current through diodes and picking off filtered positive portions of the signal. The circuit can be balanced for reference conditions, and thereby automatically reflect any variation from those reference conditions by a change in capacitance of the capacitor.

In an exemplary embodiment for use as part of a respiratory analysis instrument, such as the instrument disclosed in the patent referred to above, the change in moisture content between an atmospheric environment and the air expired by the patient can result in a change of as much as 500% in the capacitance of the capacitor. Moreover, the capacitor has a response which is on the order of $\frac{1}{50}$ of a second, thereby making it particularly well suited for a respiratory analysis instrument as well as in other application which require a very rapid response.

The change in capacitance in accordance with a change in vapor content of the capacitor is believed to be a result of the presence of water vapor particles in the immediate region of the points where the wires constituting the respective plates of the capacitor cross each other. In particular, the device has a certain overall capacitance in, for example, dry air, which is a result of the capacitance of the insulation on the wires and air spaces in between them. When moisture enters the very small air spaces between the wires at the points where they touch each other and in close proximity to those points, the dielectric constant of the air space is changed very markedly and approaches the dielectric constant of water as the number of water vapor particles present increases. The presence of a small amount of moisture in the small spaces between the wires is sufficient to cause a marked increase in the dielectric coefficient between the conductive parts of the wires. The effect is greatest at the points where the circumferences of the wires touch and becomes less as the distance between the conductive portions increases, but the overall effect on the capacitance between the two groups of wires, as mentioned above, is sufficient to cause an increase of as much as five times or more in the capacitance of the capacitor between, for example, a normal atmospheric environment and in the presence of the expired air of a patient.

Figure 2:
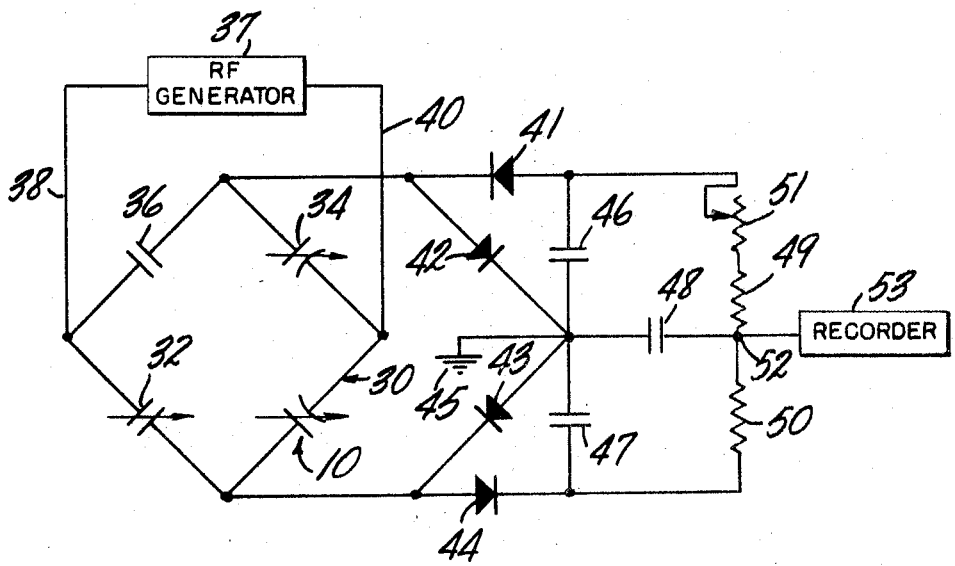

For a better understanding of the invention, reference may be made to the following description of an exemplary embodiment, taken in conjunction with the figures of the accompanying drawing, in which:

FIGURE 1 is a plan view of a capacitor embodying the principles of the present invention for use in a respiratory analysis instrument; and FIG. 2 is a diagram of an exemplary circuit for detecting the change in capacitance resulting from changes in the water vapor content of air passing through the capacitor.

Referring to FIG. 1, a capacitor 10 includes a circular frame 10a of a non-conductive material, such as Plexiglas, which carries two groups or sets 12 and 14 of spaced-apart wires constituting, respectively, the plates of the capacitor. In particular, each of the sets 12 and 14 of wires is constituted by a single wire 16 (or 18) criss-crossing back and forth between opposite segments of the frame 10a. The wires are looped around posts 20 which are defined by a groove 22 formed about the entire circumference of the frame and by radial slots 24 formed in one surface of the frame. A pair of relatively heavy wire leads 26 and 28 are suitably secured to the frame and the end of each of the wires 16 and 18 is wrapped around and soldered to the lead 26 (or 28) at the point where it is secured to the frame to provide terminals for the capacitor 10. The wires of the respective groups are preferably interwoven, as shown in FIG. 1, but they can also be laid one on top of the other. When they are woven, the stability of the capacitor is enhanced, inasmuch as the opportunity for movement of the wires relative to each other, which would change the spacing between the wires of the respective groups, is somewhat more limited.

In the exemplary embodiment as used in a respiratory analysis instrument, the frame may have a diameter of ¾ inch and the capacitance at room temperature in 50% relative humidity may be 3 mmf. as provided by 12 loops of ceramic insulated chrome alloy wire of 0.001 inch diameter. The transverse spacing between the portions of each wire 16 or 18 can be about 0.02 inch. The wires are interwoven for maximum stability. Accordingly, the capacitance of the capacitor is a function of (1) the dielectric constant existing in very small areas around the wires at the points where they actually touch, thereby making the dielectric constant at that portion very closely approach the dielectric constant of the ceramic coating; and (2) a range of values varying down from the constant of the ceramic to a value close to the dielectric constant for air.

In use, the device is installed in a nose cone, which may be of the type disclosed in my prior patent referred to previously. As a patient breathes, the inspirational phase of the respiratory process results in pulling air from the environment in through the capacitance element which, due to its construction, does not appreciably obstruct air flowing therethrough. During this phase, its electrical capacitance is close to its normal value, which can be considered a reference value. During the expirational phases of the breathing cycle, the expired air flows out through the capacitor and in the course of doing so, the water vapor permeates the spaces between the wires. The presence of water vapor between the wires constituting the respective plates of the capacitor, and particularly the moisture in close proximity to the points where the wires touch, causes a substantial change in the effective dielectric constant of the capacitor and accordingly a substantial change in its capacitance. Moreover, the change in capacitance is proportional to the water vapor content of the air. Therefore, the measured change in capacitance constitutes an accurate measure of the humidity of the expired air.

The change in capacitance of the capacitor may be measured by any suitable means, such as the circuit illustrated in FIG. 2 of the drawing. In particular, the capacitor 10 forms one branch of a bridge circuit 30, the remaining elements of the bridge circuit being two variable capacitors 32 and 34 and a capacitor 36, the variable capacitors affording adjustment of the bridge to the environmental conditions so that the voltage across the bridge is at a null value when the capacitor element 10 is in its reference environment. An alternating current is connected by leads 38 and 40 across the bridge; for example, the alternating current source may be an RF generator 37 which is utilized in the respiratory analysis instrument in my prior patent for the tidal volume measurement element. The voltage drop between the two legs of the bridge is filtered and rectified by a detector circuit constituted by diodes 41 to 44 which conduct all negative pulses to ground 45 and R-C filter networks which are composed of capacitors 46 to 48, resistors 49 and 50, and a variable balance resistor 51. The filtered D-C voltage signal is picked off the network at point 52 where it can be applied to a recorder 53 or to any suitable meter or indicator.

The above-described embodiment of the invention is merely exemplary, and those skilled in the art will be able to make various modifications and variations of it without departing from the spirit and scope of the invention. All such modifications and variations are intended to be included within the scope of the invention as defined in the appended claims.

I claim:

1. In apparatus for determining the water vapor content of a gas, the combination therewith comprising a capacitor including first and second groups of spaced-apart insulated conductive wires, the wires of each group being connected together and constituting a plate of the capacitor through which a gas will freely flow, and the insulated wires of one group crossing and touching the insulated wires of the other group at their intersections so that the presence of water vapor therebetween from the flowing gas significantly affects the capacitance between the two groups.

2. The combination according to claim 1 wherein the wires are interwoven.

3. The combination according to claim 1 further comprising means for impressing an alternating current across the capacitor, and means for measuring the capacitance of the capacitor.

4. The combination according to claim 1 wherein the capacitor includes a frame of non-conductive material and the wires of each group are portions of a continuous wire which criss-crosses back and forth and is connected to opposite parts of the frame.

5. The combination according to claim 4 wherein the frame is an annulus having radial and circumferential grooves thereon defining posts around which the continuous wire is wrapped.

6. A capacitor comprising a frame, a first group of spaced-apart insulated conductive wires supported by the frame and connected together to form one plate of the capacitor, a second group of spaced-apart insulated conductive wires connected together and mounted on the frame to cross and touch the first group of insulated wires at their intersections, the second group of wires forming another plate of the capacitor, and two terminals respectively connected to the two groups of wires.

7. A capacitor according to claim 6 wherein the wires are interwoven.

8. A capacitor according to claim 6 wherein the wires of each group are portions of a continuous wire which criss-crosses back and forth and is connected to opposite parts of the frame.

9. A capacitor according to claim 8 wherein the frame has an annulus having radial and circumferential grooves thereon defining posts around which the continuous wire is wrapped.

References Cited

UNITED STATES PATENTS

| 181,078 | 8/1876 | Larned | 340—273 |
| 336,773 | 2/1886 | Weil | 340—235 |
| 2,349,992 | 5/1944 | Schrader | 324—61 XR |
| 2,911,576 | 11/1959 | De Giers | 73—304 XR |
| 3,315,518 | 4/1967 | Carlson et al. | 73—29 |

RUDOLPH V. ROLINEC, *Primary Examiner.*

E. E. KUBASIEWICZ, *Assistant Examiner.*

U.S. Cl. X.R.

317—246; 340—235, 273